US012742416B1

(12) United States Patent
Alvanos et al.

(10) Patent No.: US 12,742,416 B1
(45) Date of Patent: Sep. 22, 2026

(54) NOSE CONE WITH DEBRIS DEFLECTION FLOW

(71) Applicant: RTX Corporation, Farmington, CT (US)

(72) Inventors: Ioannis Alvanos, West Springfield, MA (US); David A. Welch, Quaker Hill, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/203,835

(22) Filed: May 9, 2025

(51) Int. Cl.
*F02C 7/05* (2006.01)
*B64D 33/02* (2006.01)

(52) U.S. Cl.
CPC ................ *F02C 7/05* (2013.01); *B64D 33/02* (2013.01); *B64D 2033/0286* (2013.01)

(58) Field of Classification Search
CPC ...... B64D 2033/022; B64D 2033/0226; B64D 2033/0246; B64C 21/01; B64C 21/025; B64C 21/04; B64C 2230/20; B64C 2230/28
See application file for complete search history.

(56) References Cited

U.S. PATENT DOCUMENTS 5,182,906 A 2/1993 Gilchrist et al.
5,230,603 A * 7/1993 Day ...................... B64D 33/02 415/185
7,419,364 B2 9/2008 Ramstein et al.
9,003,759 B2 4/2015 Suciu et al.
9,387,923 B2 * 7/2016 Stretton ................ B64D 27/00
10,968,827 B2 * 4/2021 Alecu ...................... F02C 7/00
11,118,457 B2 * 9/2021 Ivakitch ................. B64C 11/14
11,156,093 B2 * 10/2021 Sidorovich Paradiso .................. F01D 25/02
12,326,114 B2 * 6/2025 McCaffrey ............. F02C 7/052
2010/0119376 A1 5/2010 Uihlein et al.

* cited by examiner

*Primary Examiner* — Richard Green
(74) *Attorney, Agent, or Firm* — Bachman & LaPointe, P.C.

(57) ABSTRACT

A nose cone for debris deflection comprising a deflector formed in the nose cone, the deflector configured to create a deflection air stream; the deflection air stream being configured to manipulate a fan inlet air flow such that any debris entrained in the fan inlet air flow has a trajectory line directed away from a core flow of a gas turbine engine and toward a bypass flow of the gas turbine engine.

16 Claims, 4 Drawing Sheets

NOSE CONE WITH DEBRIS DEFLECTION FLOW

BACKGROUND

The present disclosure is directed to the improved nose cone for debris deflection.

Foreign Object Debris (FOD) or simply debris entering the fan inlet causes damage not only to the fan module, but also to sensitive hardware in the core. Debris erodes, plugs cooling orifices and causes damage that limits the life of the hardware. Nose cones are designed with a slope/angle of attack to alter the path of debris in a manner to project the debris to the bypass flow rather than the core. But the debris projection to the bypass flow duct is limited to the debris being in close proximity to the nose cone.

SUMMARY

In accordance with the present disclosure, there is provided a nose cone for debris deflection comprising a deflector formed in the nose cone, the deflector configured to create a deflection air stream; the deflection air stream being configured to manipulate a fan inlet air flow such that any debris entrained in the fan inlet air flow has a trajectory line directed away from a core flow of a gas turbine engine and toward a bypass flow of the gas turbine engine.

A further embodiment of any of the foregoing embodiments may additionally and/or alternatively include the deflector is configured to create the deflection air stream which is configured to manipulate a boundary layer flow proximate the nose cone radially from a centerline axis of the nose cone.

A further embodiment of any of the foregoing embodiments may additionally and/or alternatively include the deflector is located upstream of a fan blade and arrayed circumferentially around the nose cone relative a centerline axis of the nose cone.

A further embodiment of any of the foregoing embodiments may additionally and/or alternatively include the deflector comprises an annular shape formed around the nose cone.

A further embodiment of any of the foregoing embodiments may additionally and/or alternatively include the deflector is formed with multiple individual portions arrayed about the nose cone.

A further embodiment of any of the foregoing embodiments may additionally and/or alternatively include the deflector comprises an inlet formed in the nose cone, the inlet configured to receive a portion of the fan inlet airflow into a deflector flow passage; the deflector flow passage fluidly coupled with an outlet, the outlet configured to direct the deflection air stream into the fan inlet air flow.

A further embodiment of any of the foregoing embodiments may additionally and/or alternatively include the deflector flow passage comprises a converging cross sectional flow area which changes from a first flow area proximate the inlet to a second flow area proximate the outlet; the first flow area being larger than the second flow area; wherein the deflector is configured to accelerate the deflection air stream passing through the deflector flow passage and exiting the outlet.

In accordance with the present disclosure, there is provided a gas turbine engine having a nose cone for debris deflection comprising a fan section including a fan blade upstream from a bypass duct and a core separated by a splitter; a deflector formed in the nose cone, the deflector comprising an inlet fluidly coupled with a deflector flow passage, the deflector flow passage fluidly coupled with an outlet; the deflector being located upstream of the fan blade and arrayed circumferentially around the nose cone relative a centerline axis of the nose cone.

A further embodiment of any of the foregoing embodiments may additionally and/or alternatively include the deflector flow passage comprises a converging cross sectional flow area which changes from a first flow area proximate the inlet to a second flow area proximate the outlet; the first flow area being larger than the second flow area; wherein the deflector is configured to accelerate the deflection air stream passing through the deflector flow passage and exiting the outlet.

A further embodiment of any of the foregoing embodiments may additionally and/or alternatively include the outlet of the deflector flow passage is shaped to accelerate the deflection air stream to prevent formation of flow vortices in the deflection air stream or the fan inlet airflow.

A further embodiment of any of the foregoing embodiments may additionally and/or alternatively include the outlet is shaped with an angle relative to the axis from 25 degrees to 45 degrees.

A further embodiment of any of the foregoing embodiments may additionally and/or alternatively include the deflector inlet is flush with an exterior of the nose cone.

A further embodiment of any of the foregoing embodiments may additionally and/or alternatively include the deflector inlet protrudes from an exterior of the nose cone.

In accordance with the present disclosure, there is provided a process for forming a nose cone for debris deflection comprising a fan section including a fan blade upstream from a bypass duct and a core separated by a splitter; forming a deflector in the nose cone, the deflector comprising an inlet; fluidly coupling the inlet with a deflector flow passage; fluidly coupling the deflector flow passage with an outlet; locating the deflector upstream of the fan blade; and arraying the deflector circumferentially around the nose cone relative a centerline axis of the nose cone.

A further embodiment of any of the foregoing embodiments may additionally and/or alternatively include the process further comprising forming the deflector flow passage with a converging cross sectional flow area which changes from a first flow area proximate the inlet to a second flow area proximate the outlet; forming the first flow area larger than the second flow area; and configuring the deflector to accelerate the deflection air stream passing through the deflector flow passage and exiting the outlet.

A further embodiment of any of the foregoing embodiments may additionally and/or alternatively include the process further comprising shaping the outlet of the deflector flow passage to accelerate the deflection air stream to prevent formation of flow vortices in the deflection air stream or the fan inlet airflow.

A further embodiment of any of the foregoing embodiments may additionally and/or alternatively include the process further comprising forming the deflector inlet flush with an exterior of the nose cone.

A further embodiment of any of the foregoing embodiments may additionally and/or alternatively include the process further comprising forming the deflector inlet to protrude from an exterior of the nose cone.

A further embodiment of any of the foregoing embodiments may additionally and/or alternatively include the process further comprising configuring the deflector to create the deflection air stream to manipulate a boundary layer flow proximate the nose cone radially from the centerline axis of the nose cone.

A further embodiment of any of the foregoing embodiments may additionally and/or alternatively include the process further comprising configuring the deflector to create a deflection air stream; configuring the deflection air stream to manipulate a fan inlet air flow such that any debris entrained in the fan inlet air flow has a trajectory line directed away from a core flow of a gas turbine engine and toward a bypass flow of the gas turbine engine.

Other details of the nose cone for debris deflection are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the disclosure.

DETAILED DESCRIPTION

Figure 1:
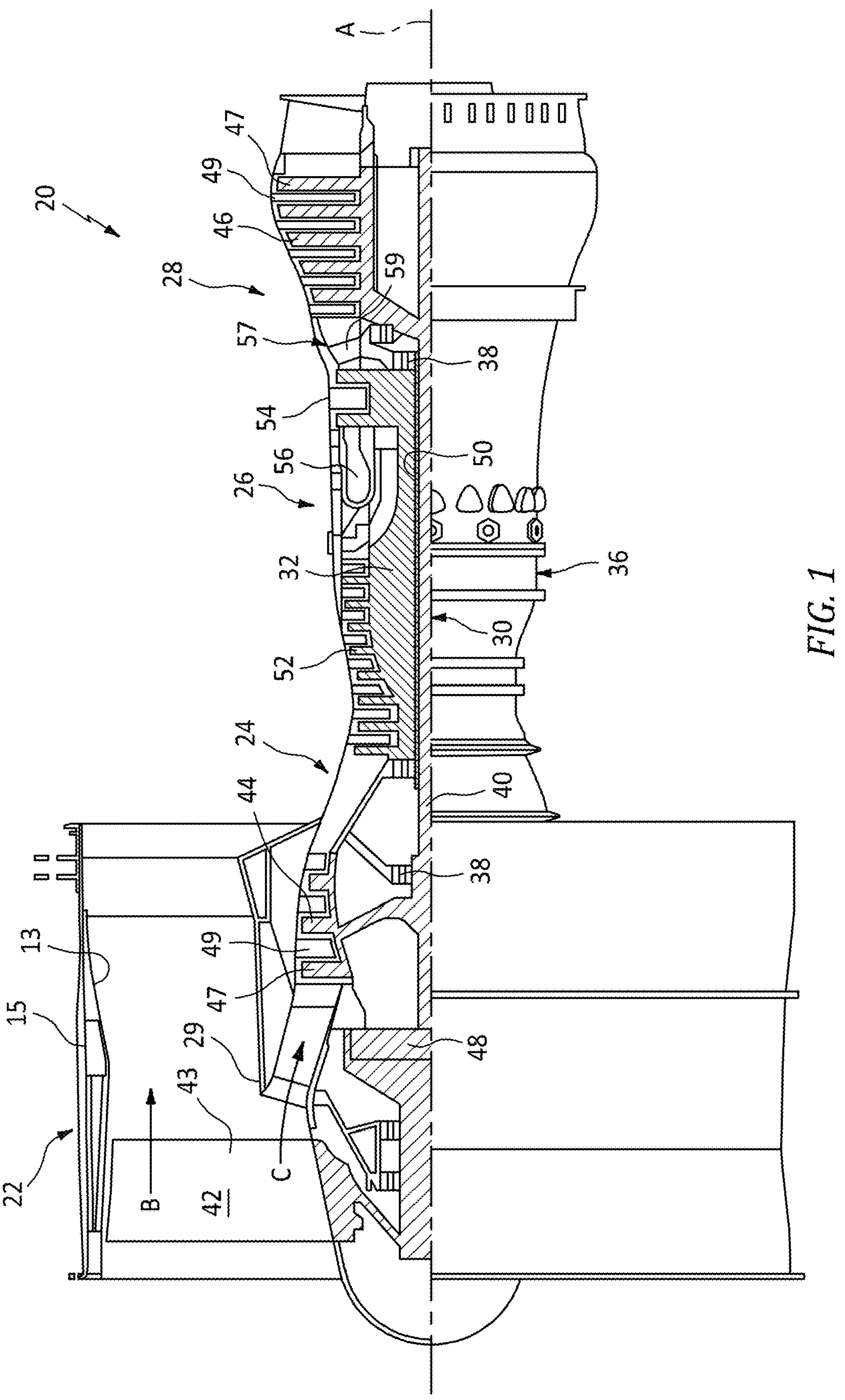
FIG. 1 is a cross section schematic view of an example turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent to the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/sec divided by an industry standard temperature correction of $[(\text{Tram}°\text{R})/(518.7°\text{R})]^{0.5}$. The "low corrected fan tip speed" can be less than or equal to 1150.0 ft/second (350.5 meters/second), and greater than or equal to 1000.0 ft/second (304.8 meters/second).

Figure 2:
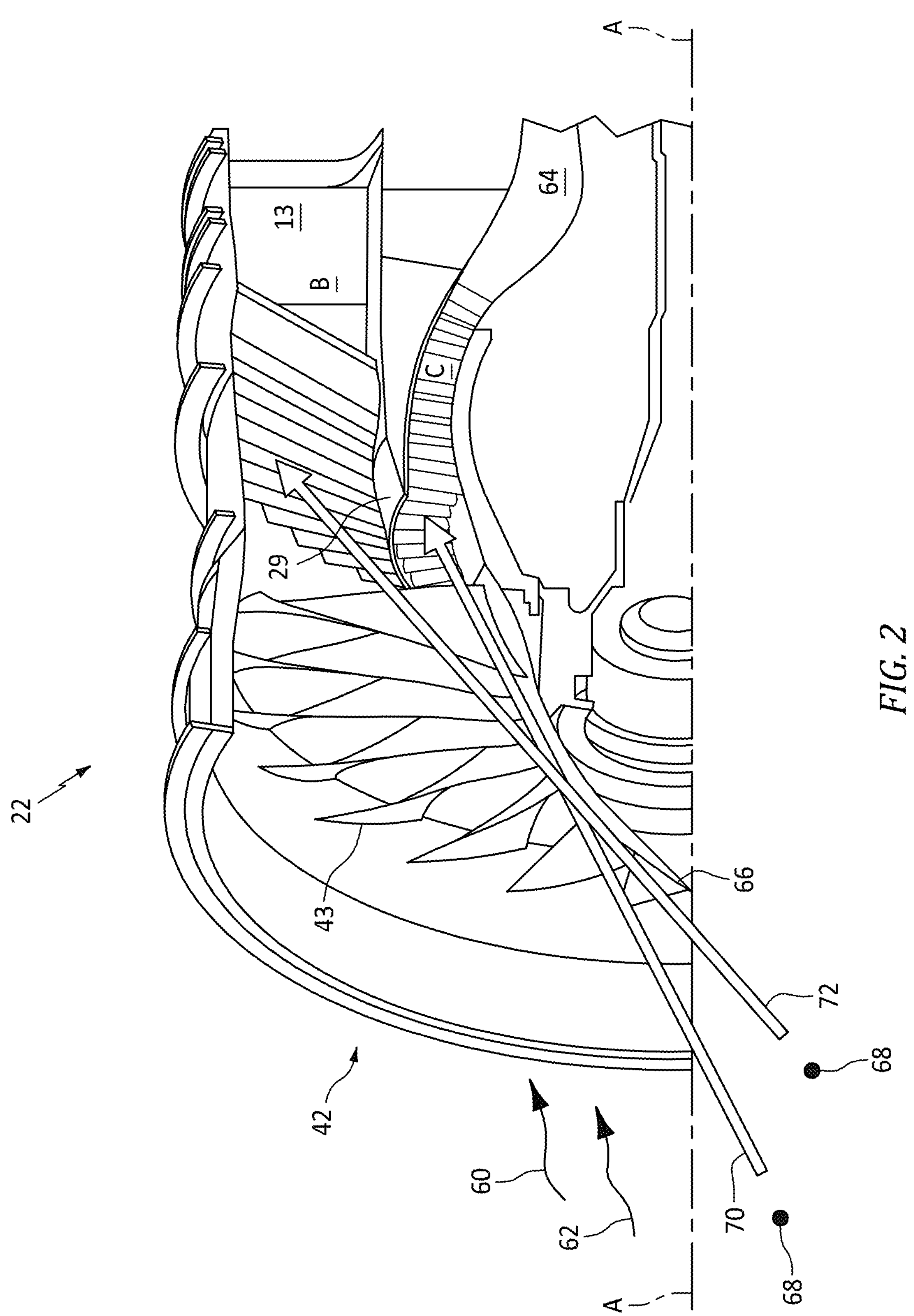
FIG. 2 is a cross section schematic representation of an exemplary fan section and downstream airflow paths.

Referring also to FIG. 2 showing an exemplary fan section 22. The fan section 22 includes the fan 42 having fan blades 43 configured to create fan airflow 60. The fan airflow 60 can be shown as fan inlet airflow 62 and downstream from the blades 43 the bypass flow B and the core flow C separated by the splitter 29. The bypass flow B flows into the bypass duct 13. The core flow C flows into the core 64. The fan inlet airflow 62 can flow past a nose cone 66. The fan inlet airflow 62 can carry debris 68. The debris 68 can include particles of sand and dust, silt, stone chips, soil and the like entrained in the fan inlet airflow 62. The debris 68 is shown with at least two trajectory lines 70 and 72. The trajectory line 70 shows the debris 68 traveling into the core flow C. The trajectory line 70 into the core flow C is unwanted and to be avoided. The trajectory line 72 shows the debris 68 traveling into the bypass flow B. The trajectory line 72 into the bypass flow B is acceptable. The trajectory line 72 can carry the debris 68 away from the core 64 and into the bypass duct 13.

Figure 3:
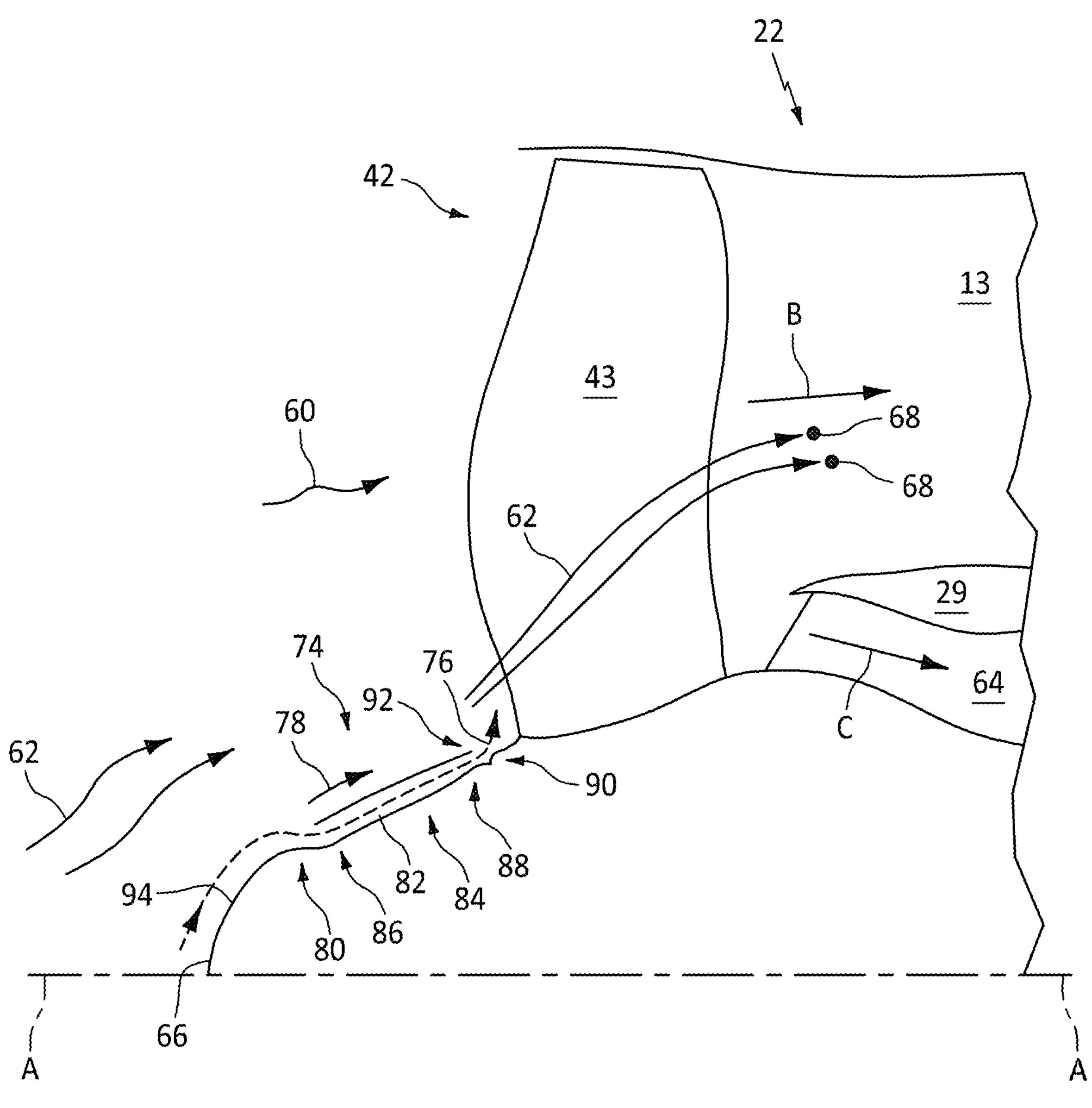
FIG. 3 is a cross section schematic representation of an exemplary nose cone.
Figure 4:
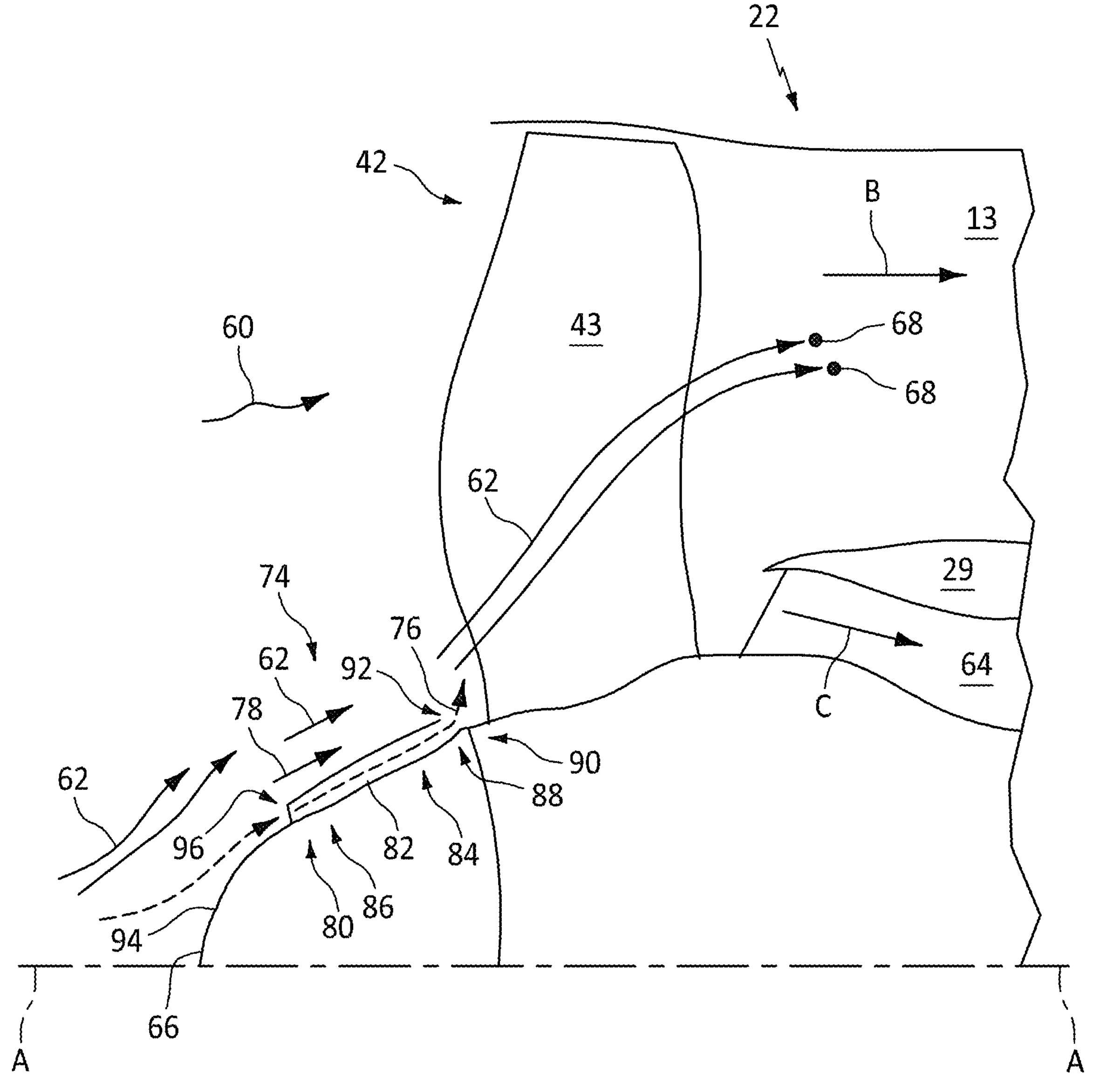
FIG. 4 is a cross section schematic representation of an exemplary nose cone.

Referring also to FIG. 3 and FIG. 4 showing exemplary nose cones 66. The nose cones 66 can include a deflector 74. The deflector 74 is configured to create a deflection air stream 76. The deflection air stream 76 can manipulate the inlet air 62 such that any debris 68 entrained in the inlet air 62 has the trajectory line directed away from the core flow C and instead toward the bypass flow B. The deflector 74 creates a deflection air stream 76 that is configured to manipulate a boundary layer flow 78 radially from the centerline axis A.

The deflector 74 can be located upstream of the fan blade 43 and arrayed circumferentially around the nose cone 66 relative to the axis A. The deflector 74 can be an annular shape formed around the nose cone 66. The deflector 74 can be made from many individual portions arrayed about the nose cone 66.

The deflector 74 can include an inlet 80 formed in the nose cone 66. The inlet 80 can be configured to receive a portion of the fan inlet airflow 62 into a cavity or deflector flow passage 82. There can be multiple deflector flow passages 82 or a single deflector flow passage 82 arrayed about the axis A. The deflector flow passage 82 can be formed as part of the nose cone 66. The deflector flow passage 82 can have a converging cross sectional flow area 84 that changes from a first flow area 86 proximate the inlet 80 to a second flow area 88 proximate an outlet 90. The first flow area 86 is larger than the second flow area 88. The deflector 74 can accelerate the deflection air stream 76 as the air 62 passes through the deflector flow passage 82 and exits the outlet 90.

The outlet 90 of the deflector flow passage 82 can be formed as a nozzle/turning vane 92. The outlet 90 can be shaped to accelerate the deflection air stream 76. The outlet 90 can be shaped to prevent the formation of flow vortices in the deflection air stream 76 or the fan inlet airflow 62. The outlet 90 can be configured to maintain laminar flow boundary in the boundary layer flow 78. In an exemplary embodiment, the outlet 90 can be shaped with an angle relative to the axis A from about 25 degrees to about 45 degrees. The outlet 90 can be shaped to direct the deflection air stream 76 tangential to the fan inlet airflow 62 entering the fan section 22. The outlet 90 can be configured to direct the deflection air stream 76 in a direction opposite a direction of the fan 42 rotation.

The deflector 74 inlet 80 can be flush with an exterior 94 of the nose cone 66, as seen in FIG. 3. The deflector 74 inlet 80 can be extended beyond (protrudes from) the exterior 94 of the nose cone 66, as seen in FIG. 4. The deflector 74 inlet 80 can be concave with respect to the exterior 94 of the nose cone 66. The inlet 80 can be configured as an air scoop 96 to gather the fan inlet air 62 into the deflector flow passage 82.

The deflector 74 can be configured to redirect the debris 68 away from the core 64. The debris 68 can include materials ranging in nominal size from about 0.05 millimeters to about 2 millimeters. The debris 68 can have a nominal size of less than 0.002 millimeters.

A technical advantage of the disclosed nose cone for foreign object debris deflection includes a nose cone geometry/curve which enhances the nose cone by adding a cavity with an inlet and outlet.

Another technical advantage of the disclosed nose cone for debris deflection includes the outlet possessing turning vanes which will drive the outlet flow thru the turning vanes to flow as a deflection air stream.

Another technical advantage of the disclosed nose cone for debris deflection includes the outlet of the cavity is on the nosecone, but forward of the fan blades to drive the flow in a tangential or other suitable direction to deflect the FOD.

Another technical advantage of the disclosed nose cone for debris deflection includes the exiting deflection air stream flow can deflect debris thru the bypass duct rather than the core to reduce hardware damage by FOD.

Another technical advantage of the disclosed nose cone for debris deflection includes an increase to the reaction area for debris to be deflected in the bypass duct to minimize hardware damage in the core.

Another technical advantage of the disclosed nose cone for debris deflection includes an Aero performance benefit relative to the direction of the exit flow in the tangential direction (or other suitable extract) entering the fan inlet blades. The directional flow of the deflection air stream flow could minimize vortices increasing the performance.

There has been provided a nose cone for debris deflection. While the nose cone for debris deflection has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A nose cone for debris deflection comprising:

a deflector formed in the nose cone, the deflector configured to create a deflection air stream;

the deflection air stream being configured to manipulate a fan inlet air flow such that any debris entrained in the fan inlet air flow has a trajectory line directed away from a core flow of a gas turbine engine and toward a bypass flow of the gas turbine engine, wherein the deflector comprises an inlet formed in the nose cone, the inlet configured to receive a portion of the fan inlet airflow into a deflector flow passage; the deflector flow passage fluidly coupled with an outlet, the outlet configured to direct the deflection air stream into the fan inlet air flow; wherein the deflector flow passage comprises a converging cross sectional flow area which changes from a first flow area proximate the inlet to a second flow area proximate the outlet; the first flow area being larger than the second flow area, wherein the deflector is configured to accelerate the deflection air stream passing through the deflector flow passage and exiting the outlet.

2. The nose cone for debris deflection according to claim 1, wherein the deflector is configured to create the deflection air stream which is configured to manipulate a boundary layer flow proximate the nose cone radially from a centerline axis of the nose cone.

3. The nose cone for debris deflection according to claim 1, wherein the deflector is located upstream of a fan blade and arrayed circumferentially around the nose cone relative a centerline axis of the nose cone.

4. The nose cone for debris deflection according to claim 1, wherein the deflector comprises an annular shape formed around the nose cone.

5. The nose cone for debris deflection according to claim 1, wherein the deflector is formed with multiple individual portions arrayed about the nose cone.

6. A gas turbine engine having a nose cone for debris deflection comprising:

a fan section including a fan blade upstream from a bypass duct and a core separated by a splitter; and a deflector formed in the nose cone, the deflector comprising an inlet fluidly coupled with a deflector flow passage, the deflector flow passage fluidly coupled with an outlet;

the deflector being located upstream of the fan blade and arrayed circumferentially around the nose cone relative a centerline axis of the nose cone, wherein the deflector flow passage comprises a converging cross sectional flow area which changes from a first flow area proximate the inlet to a second flow area proximate the outlet; the first flow area being larger than the second flow area, wherein the deflector is configured to accelerate the deflection air stream passing through the deflector flow passage and exiting the outlet.

7. The gas turbine engine having a nose cone for debris deflection according to claim 6, wherein the outlet of the deflector flow passage is shaped to accelerate the deflection air stream to prevent formation of flow vortices in the deflection air stream or the fan inlet airflow.

8. The gas turbine engine having a nose cone for debris deflection according to claim 6, wherein the outlet is shaped with an angle relative to the axis from 25 degrees to 45 degrees.

9. The gas turbine engine having a nose cone for debris deflection according to claim 6, wherein the deflector inlet is flush with an exterior of the nose cone.

10. The gas turbine engine having a nose cone for debris deflection according to claim 6, wherein the deflector inlet protrudes from an exterior of the nose cone.

11. A process for forming a nose cone for debris deflection comprising:

a fan section including a fan blade upstream from a bypass duct and a core separated by a splitter;

forming a deflector in the nose cone, the deflector comprising an inlet;

fluidly coupling the inlet with a deflector flow passage;

fluidly coupling the deflector flow passage with an outlet;

locating the deflector upstream of the fan blade;

arraying the deflector circumferentially around the nose cone relative a centerline axis of the nose cone;

forming the deflector flow passage with a converging cross sectional flow area which changes from a first flow area proximate the inlet to a second flow area proximate the outlet;

forming the first flow area larger than the second flow area; and configuring the deflector to accelerate the deflection air stream passing through the deflector flow passage and exiting the outlet.

12. The process of claim 11, further comprising:

shaping the outlet of the deflector flow passage to accelerate the deflection air stream to prevent formation of flow vortices in the deflection air stream or the fan inlet airflow.

13. The process of claim 11, further comprising:

forming the deflector inlet flush with an exterior of the nose cone.

14. The process of claim 11, further comprising:

forming the deflector inlet to protrude from an exterior of the nose cone.

15. The process of claim 11, further comprising:

configuring the deflector to create the deflection air stream to manipulate a boundary layer flow proximate the nose cone radially from the centerline axis of the nose cone.

16. The process of claim 11, further comprising:

configuring the deflector to create a deflection air stream; and configuring the deflection air stream to manipulate a fan inlet air flow such that any debris entrained in the fan inlet air flow has a trajectory line directed away from a core flow of a gas turbine engine and toward a bypass flow of the gas turbine engine.

* * * * *